(12) United States Patent
Novack et al.

(10) Patent No.: US 8,521,653 B2
(45) Date of Patent: Aug. 27, 2013

(54) SYSTEM AND METHOD FOR PROVIDING POSTAGE INDICIA

(75) Inventors: Meghan Novack, Aptos, CA (US); Richard Hernandez, Half Moon Bay, CA (US); Stephen Lee Kearney, Oakland, CA (US); Patrick Herbert Castaldo, Portland, OR (US); Aaron Tuller, Portland, OR (US)

(73) Assignee: PSI Systems, Inc., Palo Alto, CA (US)

( * ) Notice: Subject to any disclaimer, the term of this patent is extended or adjusted under 35 U.S.C. 154(b) by 144 days.

(21) Appl. No.: 12/275,953

(22) Filed: Nov. 21, 2008

(65) Prior Publication Data

US 2010/0131378 A1    May 27, 2010

(51) Int. Cl.
*G06F 17/00* (2006.01)
*G06N 5/04* (2006.01)

(52) U.S. Cl.
USPC ............................................. 705/60; 380/55

(58) Field of Classification Search
USPC .................. 380/3, 4, 21, 23; 400/76; 705/1, 705/50, 62, 60; 713/200, 201, 202; 300/3, 300/4, 21, 23
See application file for complete search history.

(56) References Cited

U.S. PATENT DOCUMENTS

| | | | |
|---|---|---|---|
| 4,812,992 A * | 3/1989 | Storace et al. | ................. 705/403 |
| 5,296,279 A | 3/1994 | Birnbaum et al. | |
| 5,742,683 A * | 4/1998 | Lee et al. | ........................ 705/60 |
| 5,848,401 A | 12/1998 | Goldberg et al. | |
| 6,010,156 A | 1/2000 | Block | |
| 6,409,592 B1 | 6/2002 | McCoy et al. | |
| 6,432,190 B1 | 8/2002 | Scholz et al. | |
| 6,505,179 B1 | 1/2003 | Kara | |
| 6,526,393 B1 | 2/2003 | Fredman | |
| 6,604,875 B2 | 8/2003 | Meunier et al. | |
| 6,671,813 B2 * | 12/2003 | Ananda | ............................ 726/3 |
| 6,735,575 B1 | 5/2004 | Kara | |
| 6,736,067 B2 | 5/2004 | Patton | |
| 6,939,062 B2 | 9/2005 | Ogg et al. | |
| 6,939,063 B2 | 9/2005 | Bussell | |

(Continued)

FOREIGN PATENT DOCUMENTS

WO    01/35347 A2    5/2001

OTHER PUBLICATIONS

W. M. Shi ; L. B. Zhang ; F. Xu ; H. W. Zhan; Embedded control system for computerized franking machine. Proc. SPIE 6794, ICMIT 2007: Mechatronics, MEMS, and Smart Materials, 67944V (Jan. 9, 2008);doi:10.1117/12.784108.*

(Continued)

*Primary Examiner* — Matthew Gart
*Assistant Examiner* — Rokib Masud
(74) *Attorney, Agent, or Firm* — Pillsbury Winthrop Shaw Pittman, LLP

(57) ABSTRACT

A method and system of providing postage indicia to a user. The method includes receiving an account number of the user at a computer server associated with a postage provider and receiving a request to print one or more postage indicia from the user at the computer server. The method further includes selectively prompting the user to enter an activation code associated with a plurality of postage labels by the computer server, wherein the prompting is waived if a predetermined parameter is satisfied; and sending, by the computer server, an authorization to print one or more postage indicia on at least one of the plurality of postage labels to the user if the activation code is valid.

22 Claims, 9 Drawing Sheets

(56) References Cited

U.S. PATENT DOCUMENTS

| | | |
|---|---|---|
| 7,083,345 B1 | 8/2006 | Kuwahara |
| 7,085,725 B1 | 8/2006 | Leon |
| 7,191,158 B2 | 3/2007 | Ogg et al. |
| 7,194,957 B1* | 3/2007 | Leon et al. .................... 101/485 |
| 7,203,666 B1 | 4/2007 | Gravell et al. |
| 7,251,632 B1* | 7/2007 | Ogg et al. ....................... 705/62 |
| 7,343,357 B1 | 3/2008 | Kara |
| 7,383,194 B2 | 6/2008 | Heiden et al. |
| 7,396,048 B2 | 7/2008 | Janetzke et al. |
| 2001/0013025 A1* | 8/2001 | Ananda .......................... 705/60 |
| 2002/0040353 A1 | 4/2002 | Brown, Jr. et al. |
| 2002/0046195 A1 | 4/2002 | Martin et al. |
| 2002/0073039 A1 | 6/2002 | Ogg et al. |
| 2002/0083020 A1 | 6/2002 | Leon |
| 2004/0070194 A1 | 4/2004 | Janetzke et al. |
| 2007/0100672 A1 | 5/2007 | McBrida et al. |
| 2010/0127490 A1* | 5/2010 | Novack et al. .................. 283/71 |

OTHER PUBLICATIONS

International Search Report in related application PCT/US2009/065146 mailed Mar. 15, 2010.

International Preliminary Report on Patentability in related International Application No. PCT/US2009/065146 mailed Feb. 28, 2011.

* cited by examiner

SYSTEM AND METHOD FOR PROVIDING POSTAGE INDICIA

BACKGROUND OF THE INVENTION

1. Field of the Invention

The present invention pertains to postage indicia, postage sheets containing postage indicia, a method and system of providing postage indicia, and a method of printing postage indicia.

2. Discussion of Related Art

Purchasing postage indicia (e.g., postage stamps) through the internet is increasingly used as a way to obtain postage without a trip to the local post office or local store. This allows a consumer to print postage at the comfort of the consumer's home or office. For example, in the United States, various internet postage providers operating under the approval of the U.S. Postal Service (USPS) sell various forms of internet postage. Typically, the consumer purchases from a stationary supplier or from the internet postage provider items and supplies for mailing and shipping needs including a sheet of adhesive mailing labels or postage labels. The consumer then uses a personal computer to access the internet postage provider to purchase postage. Upon receiving payment from the consumer or user, the internet postage provider sends data back to the personal computer of the user allowing the user to print the postage indicia using a ubiquitous personal printer, such as an inkjet or laser printer, connected to the personal computer.

However, the postage label must conform with many specifications including security and authenticity of postage labels set by the USPS before permitting the use of the internet postage indicia in a mailing piece that can be delivered via the postal service. For example, the USPS may require that certain codes, marks or the like be printed in a predetermined configuration on the postage label. Therefore, the orientation or way of feeding postage label sheets into the printer may be critical. This is especially true when printing an entire sheet of postage labels. Indeed, a misprint of the postage indicia in the postage sheet may cost the consumer money or the hassle of requesting a reimbursement by submitting a proof of a misprint.

In addition, printing postage indicia can be subject to potential theft associated with customers manufacturing of their own postage label sheet on which to print postage indicia (for example using desktop printing) thereby bypassing the internet postage provider and thus depriving the internet postage provider from revenue associated with the purchase of the postage label sheets. Furthermore, printing postage indicia can also be subject to theft associated with customers creating their own postage using sheets purchased from the internet postage provider by printing fake indicia imitating real postage indicia thus potentially depriving the postal service and the internet postage provider from revenue associated with the purchase of postage indicia through the internet postage provider.

The present invention addresses various issues relating to the above.

BRIEF SUMMARY OF THE INVENTION

An aspect of the present invention is to provide a printable postage sheet. The printable postage sheet includes a plurality of substantially equally sized preprinted postage labels arranged in a matrix of n rows by m columns, where n and m are integers. The plurality of preprinted postage labels are symmetrically arranged in the printable postage sheet with respect to a first axis and a second axis perpendicular to the first axis. Preprinted indicia on each of the preprinted postage labels are preprinted on generally the same location on all of the preprinted postage labels. The preprinted indicia are all oriented in a same orientation relative to the sheet. A printable area of each preprinted postage label is positioned on the label such that when indicia are printed on one or more of the preprinted postage labels, the indicia are positioned within the printable area irrespective of a right side up or upside down feeding orientation of the printable postage sheet into a printer.

Another aspect of the present invention is to provide a printable postage sheet. The printable postage sheet includes a backing liner having rows and columns defined by perforations disposed between mutually adjacent rows and between mutually adjacent columns, so as to define a plurality of separable liner portions. The printable postage sheet further includes a plurality of substantially equally sized preprinted postage labels, each preprinted postage label being releasably adhered on an associated one of the separable liner portions. The plurality of preprinted postage labels are symmetrically arranged on the printable postage sheet with respect to a first axis and a second axis perpendicular to the first axis.

Another aspect of the present invention is to provide a method of providing postage indicia to a user. The method includes receiving an account number of the user at a computer server associated with a postage provider and receiving a request to print one or more postage indicia from the user at the computer server. The method further includes selectively prompting the user to enter an activation code associated with a plurality of postage labels by the computer server, wherein the prompting is waived if a predetermined parameter is satisfied; and sending, by the computer server, an authorization to print one or more postage indicia on at least one of the plurality of postage labels to the user if the activation code is valid.

A further aspect of the present invention is to provide a method of printing postage indicia. The method includes entering an account number associated with a user into a personal computer associated with the user, the personal computer being in communication with a computer server associated with a postage provider; requesting the computer server associated with the postage provider authorization to print one or more postage indicia on one or more postage labels; inputting an activation code associated with the one or more postage labels into the personal computer if the computer server requests the activation code, wherein the activation is requested depending upon a plurality of parameters associated with the account number; and printing the one or more postage stamps on the one or more postage labels if the activation code is valid.

Another aspect of the present invention is to provide a method of processing a request for printing one or more postage indicia on one or more postage labels. The method includes receiving an account number of the user at a computer server associated with a postage provider; receiving a request to print the one or more postage indicia from the user at the computer server; and selectively prompting the user to enter an activation code associated with the one or more postage labels by the computer server, wherein the prompting is waived if a predetermined parameter is satisfied.

Yet another aspect of the present invention is to provide a system application program, the program when executed by a personal computer in communication with a computer server causes the computer to perform a process. The process includes prompting a user to enter an account number associated with the user; and selectively prompting the user to enter an activation code associated with a plurality of postage labels when the user enters a request to print one or more postage indicia on one or more postage labels in the plurality of postage labels or when the user enters the account number associated with the user. The prompting is waived if a predetermined parameter is satisfied.

Although the various steps of the method of providing or printing postage stamps are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

Figure 1:
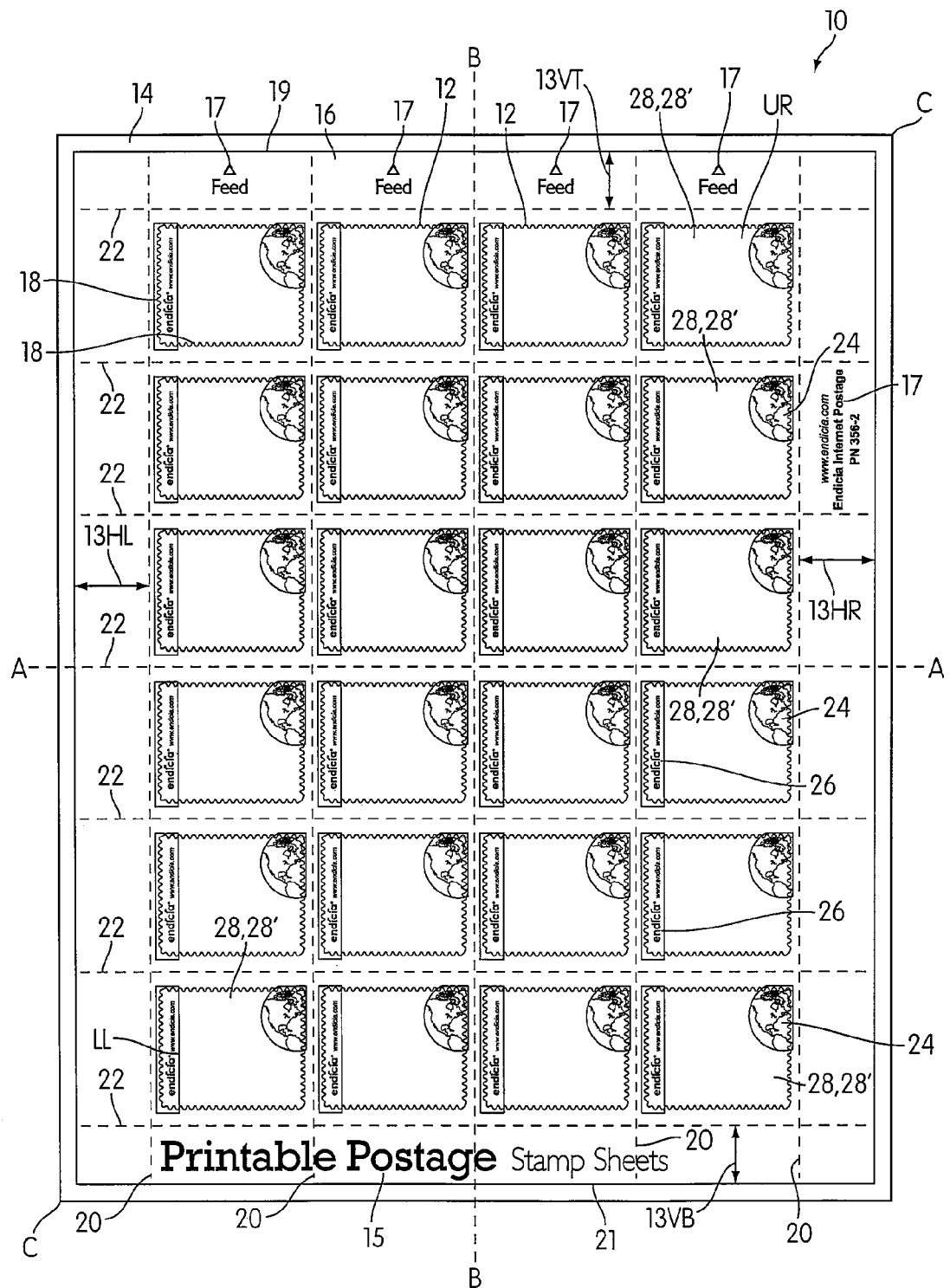
FIG. 1 is a view of a postage label sheet having a plurality of postage labels, according to an embodiment of the present invention.

FIG. 1 is a view of a single printable postage label sheet 10, according to an embodiment of the present invention. As shown in FIG. 1, the printable postage label sheet 10 has a plurality of equal size postage labels 12. The postage labels 12 are arranged in a n by m matrix, where n and m are integer numbers (1, 2, 3, 4, 5, 6, etc.) of rows (n) and columns (m). In one embodiment, twenty four labels 12 may be provided on the postage label sheet 10. As shown in FIG. 1, the postage labels can be arranged in a matrix 6 by 4, i.e., 6 rows by 4 columns.

The printable postage sheet 10 is a laminated sheet comprising a substrate or backing liner 14 (e.g., thin sheet of paper or a thin sheet of plastic) on which is adhesively bonded a carrier sheet 16. The carrier sheet 16 comprises the plurality of postage labels 12. Each of the postage labels 12 has a die-cut perimeter 18 which allows a user to readily separate the postage label 12 from the carrier sheet 14. In one embodiment, the die-cut perimeter 18 has a jagged edge to enhance visual appeal. Although a sinusoidal-type jagged edge is illustrated in FIG. 1, it can be appreciated that any jagged shape can be used. For example, the jagged edge can be a series of semi-circles or a series of triangular or rectangular shapes, etc.

In one embodiment, the substrate 14 is a coated sheet of paper. The coating in the sheet of paper is selected such that the carrier sheet 16 adheres to the coating of the substrate 14 while the carrier sheet 16 can be easily released from the coating if desired. For example, the coating can contain a release agent such as silicon. The carrier sheet 16 has a printable front side on which can be printed various indicia on the various postage labels 12 (such as the value of the postage stamps and various codes and marks) defining the postage stamp and an opposite back side covered with an adhesive layer. The adhesive layer is selected such that the carrier sheet 16 is releasably bonded to the substrate 14 (e.g., coated paper).

As a result, any of the postage labels 12 in the carrier sheet 16 can be separated from the carrier sheet 16 and the substrate 14 by peeling off the postage label 12. When a postage label 12 in the carrier sheet 16 is detached from the substrate 14 and is applied on a piece of mail, the adhesive layer on a back of the postage label 12 forms a permanent bond and the postage label 12 bonds or adheres to the piece of mail permanently.

As stated above, the postage label sheet 10 has a plurality of postage labels 12 arranged in rows and columns. In one embodiment, the placement of postage labels on the postage label sheet 10 is symmetrical relative to a horizontal axis AA dividing the sheet 10 in two identical halves and a vertical axis BB bisecting the postage label sheet 10 in two identical halves. The number of rows on each side of the horizontal axis AA is the same, i.e., the number of rows on each side of axis AA is equal to n/2 (in the example illustrated in FIG. 1, 3 rows on each side of axis AA). Similarly, the number of columns on each side of axis BB is equal to m/2 (in the example illustrated in FIG. 1, 2 columns on each side of axis BB).

In one embodiment, the postage label sheet 10 has a set of vertical and horizontal margins reserved between a border of an area containing the postage labels 12 and a border of the postage label sheet 10. A margin area 13HL on a left side of the postage label sheet 10 is substantially equal to the margin 13HR on a right side of the postage label sheet 10. Similarly, a margin 13VT on a top side of the postage label sheet 10 is substantially equal to a margin 13VB on a bottom side the postage label sheet 10. Therefore, it can be seen that the postage labels sheet 10 has a C2 group symmetry. In other words, a rotation of 180 degrees around an axis perpendicular to the plane containing the postage label sheet 10 and passing through a center of the sheet 10 (which is the intersection point of axis AA and axis BB) would yield an unchanged postage label sheet in terms of placement of the labels 12. On the margins 13HL, 13HR, 13VT and 13VB, various codes or references can be printed. For example, as shown in FIG. 1, the phrase "Printable Postage Stamp Sheets" 15 is printed on the margin 13HL, and an activation code "PN 356-2" 17 is printed in the margin 13HR. As will be explained further in detail in the following paragraphs, the activation code is specific to each printable postage sheet 10 and is used to authenticate the printable postage sheet 10 to be able to print postage indicia on the postage label sheet 10.

The phrase "Printable Postage Stamp Sheets" 15 provide the user with an indication of the right side up orientation of the postage label sheet 10. That is, the sheet is printed in a right side up orientation when the letters in the phrase 15 are in the same readable right side up orientation as the indicia printed by the printer in a subsequent postage printing operation. Additionally, or alternatively, "Feed" arrows 17 are provided for proper orienting of the sheet 10 into a printer. When the edge 19 of the sheet 10 to which arrows 17 point is inserted into a printer first, the indicia (e.g., postage) will be printed on the sheet 10 in a right side up orientation. If the opposite edge 21 is inserted into the printer first, the indicia (e.g., postage) will be printed in an upside down orientation.

In one embodiment, the postage label sheet 10 further comprises vertical perforation lines 20 and horizontal perforation lines 22 to facilitate folding of the sheet 10, for example for carrying in a wallet, purse or pocket (e.g., shirt pocket). The perforation lines 20, 22 can also facilitate tearing and dividing the postage labels sheet 10 into separate portions if so desired. The perforations lines 20 and 22 are provided in the substrate or backing liner 14 as well as in the carrier sheet 16. As a result, the backing liner or substrate 14 has rows and columns defined by perforations 20, 22. The perforations 20 and 22 are disposed between mutually adjacent rows and between mutually adjacent columns, so as to define a plurality of separable liner portions. Each of the plurality of substantially equally sized postage labels 12 is disposed on a corresponding one of the plurality of separable liner portions. The horizontal perforation lines 22 can be placed between mutually adjacent rows of postage labels and the vertical perforation lines 20 can be placed between mutually adjacent columns of postage labels. The vertical perforation lines 20 can be placed between each column or every two columns, or any desired arrangement. Similarly, the horizontal perforation lines 22 can be placed between each row or every two rows, or any desired arrangement. For example, the horizontal perforation lines 22 can be placed between two adjacent rows, every two rows and the vertical perforation lines 20 can be placed between two columns every column. However, as it can be appreciated any arrangement of the perforation lines can be implemented as desired. In addition, horizontal perforations lines 22 can also be provided between the margin 13VT and the labels 12 and/or between the margin 13VB and the labels 12. Similarly, vertical perforation lines 20 can also be provided between the margin 13HL and the labels 12 and/or between the margin 13HR and the labels 12.

In an embodiment in which an odd number of columns are provided, the vertical axis of symmetry will run through the middle of the middle column of stamps (not illustrated). Similarly, where an odd number of rows are provided, the horizontal axis of symmetry runs through the middle of the middle row of stamps (not illustrated).

Figure 2A:
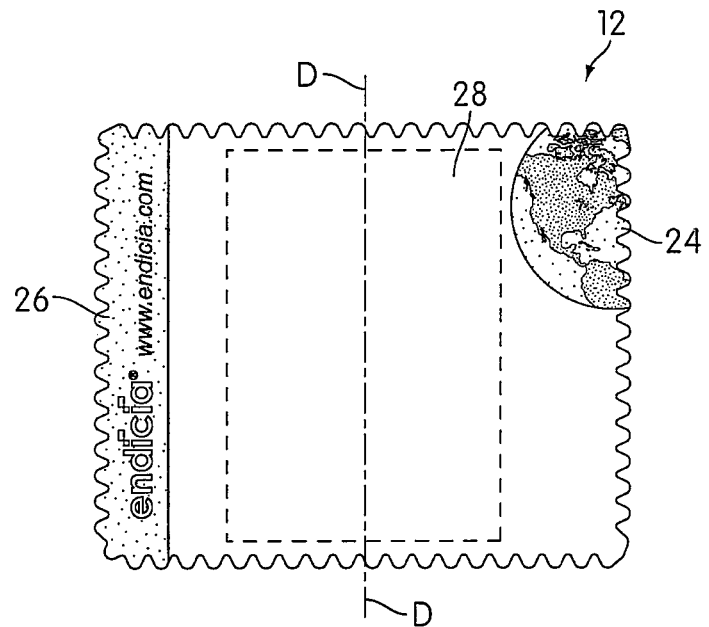
FIG. 2A is a front view of the preprinted postage label depicted in FIG. 1 showing a location of one printable area within the postage label, according to one embodiment of the present invention.
Figure 2B:
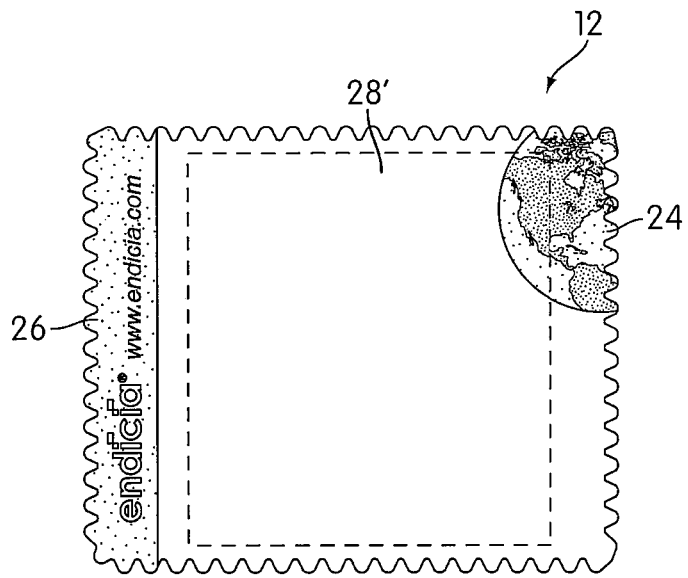
FIG. 2B is a front view of the preprinted postage label depicted in FIG. 1 showing a location of another printable area within the postage label, according to one embodiment of the present invention.

FIG. 2A is a front view of the preprinted postage label 12 showing a location of one printable area 28 within the postage label 12, according to one embodiment of the present invention. FIG. 2B is a front view of the preprinted postage label 12 showing a location of another printable area 28', within the postage label 12, according to one embodiment of the present invention. The postage label 12 can be preprinted with various marks and graphics. As shown in FIGS. 2A and 2B, the postage label 12 is preprinted with a graphical image 24 and other characters and designs 26. In the illustrated embodiments, the graphical image 24 is a portion of a globe (or a depiction of the Earth). However, as it can be appreciated, the graphical image 24 can be any desired image or graphics such as, for example, an envelope, a mailbox, a pigeon, an eagle, etc. In one embodiment, the graphical image 24 can be positioned on the upper right corner of each postage label 12. However, the graphical image 24 and the design 26 can be positioned anywhere around the periphery of the postage label 12. In one embodiment, as shown in FIG. 1, the location of the graphical image 24 can be the same in all the preprinted postage labels 12. The graphical image 24 is positioned at the upper-right corner of each preprinted postage label 12. Similarly, the location of the characters 26 can also be the same in all the preprinted postage labels. The characters 26 are positioned on the left side of each preprinted postage label 12. As shown in FIGS. 1 and 2A and 2B, the preprinted postage label 12 further includes a printable area 28, 28'. The printable area 28, 28' can have various sizes. For example, in one embodiment, as illustrated in FIG. 2A, the printable area 28 is a blank area or a non-printed area. The blank area 28 does not overlap any of the preprinted areas including the graphical image 24 or the characters 26. In this embodiment, the blank area 28 is centered or symmetrically positioned within the stamp 12 such that an axis DD, which splits the preprinted postage label 12 in two geometrically identical halves, also splits the blank area 28 in two identical halves. In another embodiment, as illustrated in FIG. 2B, the printable area 28' can overlap at least partially with the graphical image 24. In one embodiment, the printable area 28' can overlap at least partially with the graphical image 24 when the preprinted postage label 12 is printed upside down, as described above.

Figure 3A:
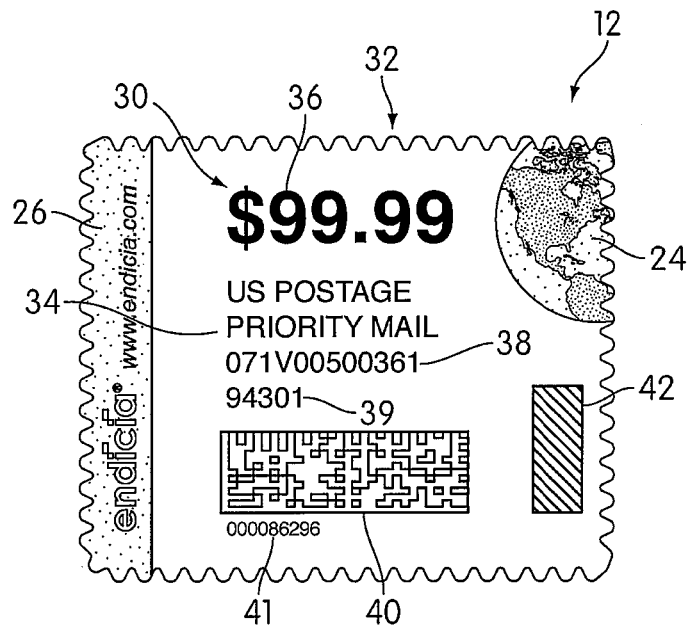
FIG. 3A is a view of a postage label shown in FIG. 2A on which are printed various postage indicia to form a postage stamp, according to an embodiment of the present invention.

FIG. 3A is a front view of a postage label 12 on which are printed various postage indicia 30 to form a postage stamp 32, according to an embodiment of the present invention. The postage stamp 32 may include, in addition to the preprinted graphical image 24 (e.g., a globe) and the preprinted characters 26, other indicia including the type of postage stamp 34 such as first class, international, priority mail, express mail, etc. The postage stamp 32 can also include a human readable monetary value indicator 36 such as, for example, $0.42 or $99.99, etc. The postage stamp 32 may also includes a serial code 38 specific to each postage stamp 32, a zip code 39 indicating the place of origin of the stamp 32, and a machine readable authentication mark 40. In one embodiment, the serial code 38 corresponds to the activation code 17 that is printed on a margin of the postage label sheet 10 (shown in FIG. 1). In another embodiment, the serial code 38 includes at least a portion of the activation code 17. In yet another embodiment, the serial code 38 can be different from the activation code 17 and may not contain any portion of the activation code 17. In another embodiment, the serial code 38 can include an account number of the user that printed the postage stamp 32. In one embodiment, the serial code 38 (e.g., "071V00500361") can contain the internet postage provider's number "07", the model number "1V" of an application program used to print the postage stamp 32 and the account number "00500361" of the user that printed the postage stamp 32. In one embodiment, the machine readable authentication mark 40 can be, for example, a data-matrix 2D barcode. In one embodiment, the authentication mark 40 can be used by the postal service (e.g., USPS) to verify the authenticity of the stamp 32. In another embodiment, the mark 40 is an information based indicia (IBI-lite) indicium and within the mark 40, data such as the indicia version number (which is a fixed number corresponding to a specific indicia, for example "1"), a piece counter (which corresponds to the order number in which the postage is purchased by the user's account), information based indicia (IBI) vendor-model (which is a unique number that represents a combination of the internet postage provider and model number of the device used to print or read the 2D-bar code), a user's account number, the monetary value of the postage, the zip code origin of the postage, or an intelligent mail service code (which is a number that indicates service class of a mail piece on which the postage is affixed, weight of the mail piece, zone of origin of the mail piece, shape of the mail piece and/or the type of sorting of mail used by the postal service), and/or other type of data, or any combination of two or more thereof, can be imbedded in the mark 40. Hence, the mark 40 can be used to extract information on the stamp 32 such as the monetary value on the stamp 32, the zip code origin of the stamp and/or other data. The postage label 12 may also include a printed order number 41 (e.g., 000086296). The printed order number 41 corresponds to the order in which the postage stamp 32 is purchased by the user's account.

As shown in FIG. 3A, all the visible indicia 30 printed on the postage stamp 32 are printed within the printable area 28, 28' of the postage label 12. For example, all the visible indicia 30 are printed within the blank area 28, as shown in FIG. 3A. In addition to the visible indicia 30, the postage stamp 32 may also include an invisible mark 42. The invisible mark 42 can be preprinted on the postage label 12 using an invisible ink such as a fluorescent ink or the like. The invisible mark 42 is invisible to the eye but can be visible to a machine. The invisible mark 42 can be used by the electronic postage readers of the postal service to enable the postage reader to identify the fact that postage is present and to prompt the image reader scanner to look for and scan the machine readable indicia or mark 40. In one embodiment, the invisible mark 42 can be used by the postal service to authenticate the postage. In one embodiment, the invisible mark 42 can be located in the lower right corner of the postage stamp 32, as represented schematically in FIG. 3A by a dashed rectangle. In another embodiment, the invisible mark 42 can be located generally within the area where characters or designs 26 are preprinted. For example, the invisible ink can fill substantially a whole surface (vertical rectangle) of the design 26. In one embodiment, the invisible ink (e.g. fluorescent ink) of the invisible mark 42 can be mixed with a visible ink that is used to print the characters or designs 26 (e.g., mixed with visible ink used to print the vertical rectangle). In yet another embodiment, the invisible mark 42 can be located on the graphical image (e.g., globe) 24. However, as it can be appreciated, the invisible mark can be positioned anywhere on the postage stamp 32.

By symmetrically arranging the postage labels 12 in the postage labels sheet 10 and orienting and sizing the printable area 28, 28' of the preprinted postage label appropriately, a rotation of the printable postage sheet 10 by 180 degrees that inserts the sheet 10 upside down into a printer will nevertheless enable the printer to print within a printable area 28, 28' on one of the postage labels. For example, a sheet 10 that is properly fed into a printer will have the postage label 12 in lower left hand corner (see LL) printed first. If, however, the sheet 10 is inserted into the printer upside down, the postage label in the upper right hand corner (see UR) of FIG. 1 (when FIG. 1 is viewed right side up) will be printed first. The printable area 28, 28' of each of these stamps are similarly oriented relative to the adjacent corners C of label sheet 10 such that the postage intended to be printed on the stamp at LL will nevertheless be printed on the stamp at UR, within the printable area 28, 28' of UR.

Figure 3B:
FIG. 3B is a view of the postage label shown in FIG. 2A on which the postage indicia are printed upside down in a printable blank area shown in FIG. 2A, according to an embodiment of the present invention.

FIG. 3B is a front view of the postage label 12 on which the postage indicia 30 are printed upside down in printable blank area 28, according to an embodiment of the present invention. As shown in FIG. 3B, the globe 24 appears in a lower left hand corner of the postage label 12 relative to the printed indicia 30 (which is printed by the printer) when the indicia 30 is viewed right side up, rather than the globe 24 appearing in the upper right hand corner if the sheet 10 had been printed as intended. In this illustrated embodiment, because the printable area or blank area 28 is centered within the label 12, the printed indicia 30 printed within the centered blank area 28 are not overlapping or superimposed to the preprinted areas 24 and 26 in both the case when the postage label is oriented and introduced upside up as shown in FIG. 3A or upside down as shown in FIG. 3B.

As depicted in FIG. 2A, the printable area 28 may be centrally and/or symmetrically located on the postage label 12. However, this is not required to achieve the feature discussed above. As a result, feeding the printable postage sheet 10 into a printer in one direction or in an opposite direction does not substantially change the layout of the printed stamps. Therefore, no special instructions to assist the user with the proper feeding of sheets of labels into a printer may be needed. The labels can be printed properly with postage indicia independent on the feeding orientation of the label sheet 10. In other words, the indicia printed on one or more preprinted postage labels are positioned within substantially the printable area 28, 28' in the preprinted postage labels 12 independent of a feeding orientation of the printable postage sheet into a printer.

Figure 9:
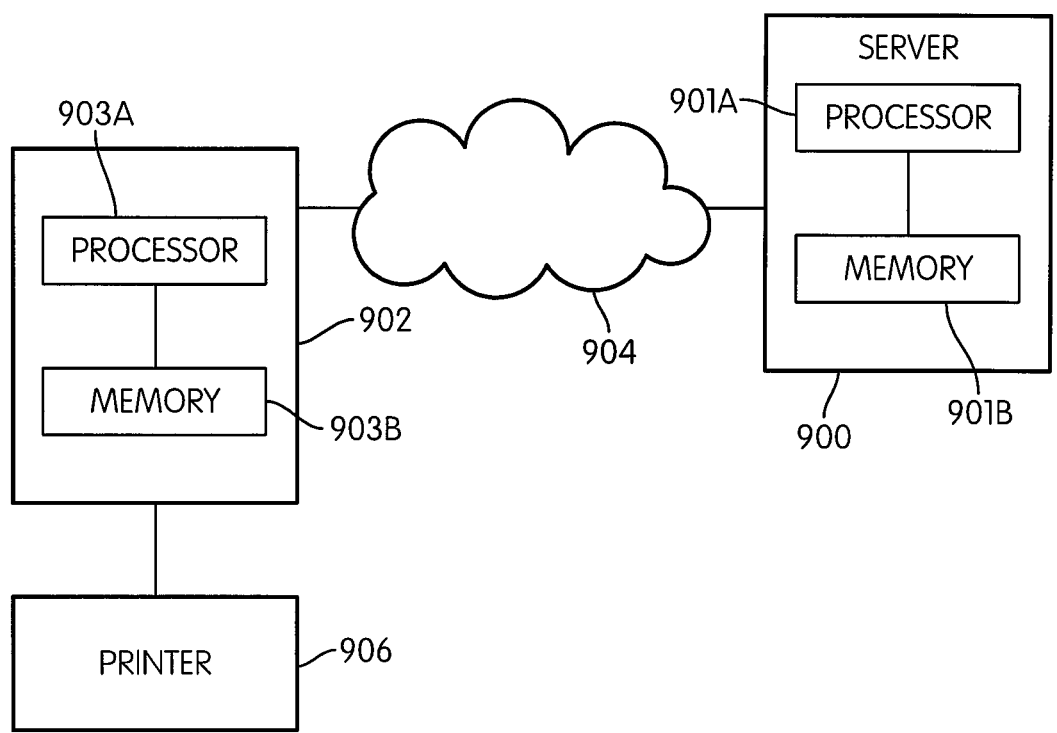
FIG. 9 shows a connection diagram for accessing a computer server associated with an internet service provider by a personal computer of a user via the internet, according to one embodiment of the present invention.

In order to purchase postage indicia, such as indicia used to create postage stamps, through the internet, a consumer employs a software application to allow the consumer to access a web service in a server of an internet postage provider to purchase postage indicia. FIG. 9 shows a connection diagram for accessing a computer server 900 associated with the internet service provider by the user's personal computer 902 via the internet 904, according to one embodiment of the present invention. As shown in FIG. 9, both the computer server 900 and the personal computer 902 are connected via the internet 904. As it can be appreciated, in one embodiment, the computer server 900 has at least one processing device 901A and at least one storage device (memory) 901B in communication with the processing device 901A. Although the storage device 901B is shown residing the computer server 900, the storage device 901B can reside outside the server 900, for example in another storage server (not shown). Similarly, the personal computer 902 comprises a processor 903A and a storage device (memory) 903B in communication with the processor 903A. Various peripheral devices can be connected to the personal computer 902. For example, as shown in FIG. 9, a printer 906 is shown connected to the personal computer 902. The software application that is employed by the user (consumer) to access a web service in the server 900 to purchase and print indicia can reside in the user's personal computer 902. The software application is an implementation of a method for purchasing postage indicia.

The software application can be obtained from the internet postage provider or other vendors having a business relationship with the internet postage provider. For example, the software application can be downloaded from an internet webpage of the internet postage provider. For example, the software application can be downloaded from the server 900. Alternatively, the software application can be obtained in a storage medium such as a CDROM, a USB flash memory or a PCMCIA memory card. The software application can be obtained free of charge or for a fee. Once the software application is installed in a personal computer 902 of the user, the software application is ready to be used by the consumer to purchase postage indicia. By personal computer 902, it is meant that any computing device capable of running the software application and providing for the user access to the internet 904 can be used, such as, but not limited to, a desktop computer, a laptop computer, a handheld computing device, etc. Alternatively, the user does not need to install the software application on the personal computer 902. For example, the software application can be a web-based application and can be executed in the computer server 900 associated with the internet postage provider.

Figure 4:
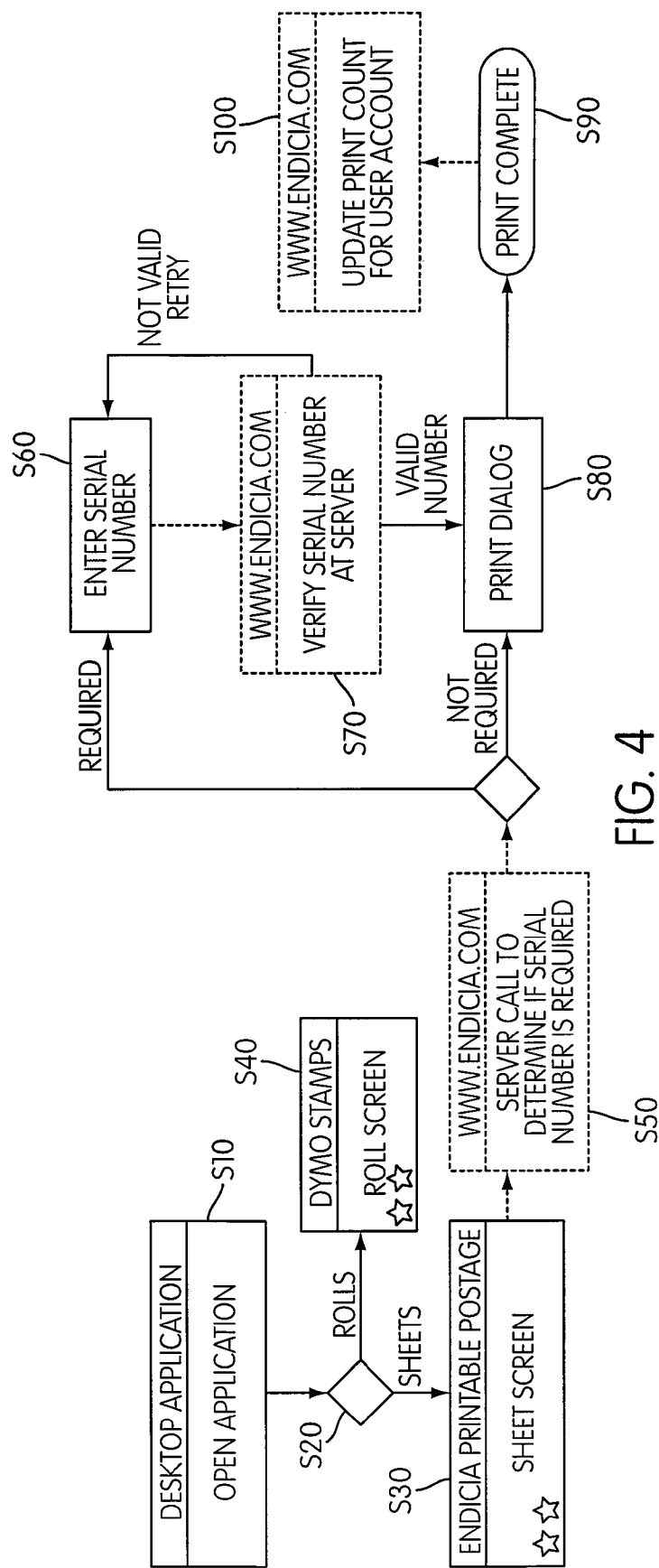
FIG. 4 is a flow diagram of a method of providing postage indicia, according to an embodiment of the present invention.

FIG. 4 is a flow diagram of a method of providing postage indicia, according to one embodiment of the present invention. At S10, the user runs a software application containing the method of providing postage indicia. The user is prompted to enter an account number and a password. Once the account number is validated by a computer server associated with the internet postage provider, the user can select on what type of medium the user wishes to print, at S20. In one embodiment, the user is provided with two options. One option is printing on sheets of postage labels, at S30 while the other option is printing on rolls of postage labels, at S40. In the case the user selects to print sheets of postage labels, at S30, a window 50 is displayed on a screen of the user's personal computer.

Figure 5:
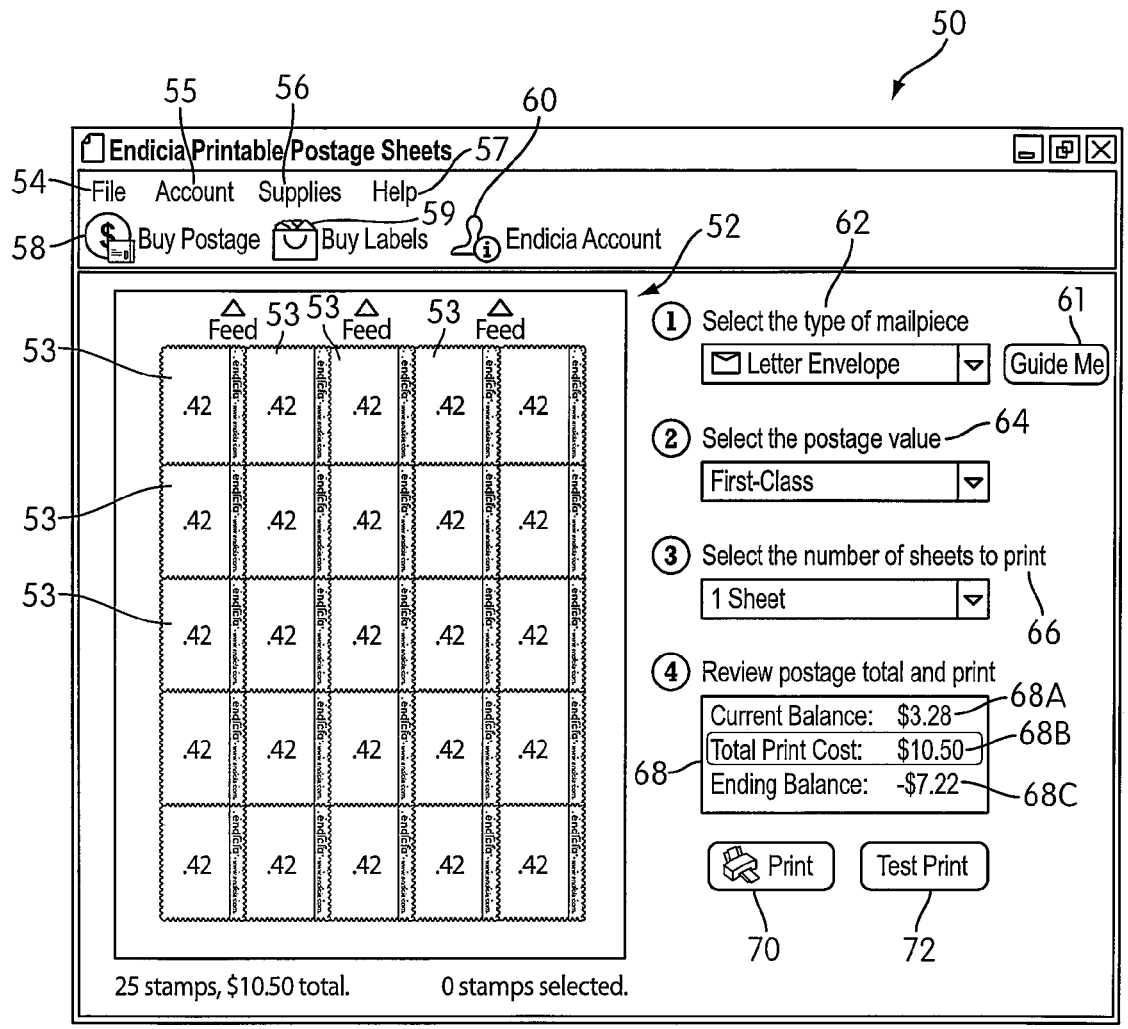
FIG. 5 depicts a window for selecting various parameters of the postage indicia, according to an embodiment of the present invention.

FIG. 5 depicts the window 50, according to an embodiment of the present invention. Window 50 includes an area 52 where images of a plurality of postage labels 53 are displayed. This window allows the user to select the number postage labels desired. In one embodiment, all the postage labels are initially selected by default. In one embodiment, the postage labels that are selected are highlighted. The user can deselect postage labels by clicking on a corresponding image 53 of the postage label. In another embodiment, none of the postage labels is selected. In which case, the user can select desired postage labels by clicking on corresponding images 53 of the postage stamps. That is, the user can select the desired postage labels to be printed with postage indicia so as to obtain indicia printed postage labels such as, for example, postage stamps.

Figure 6:
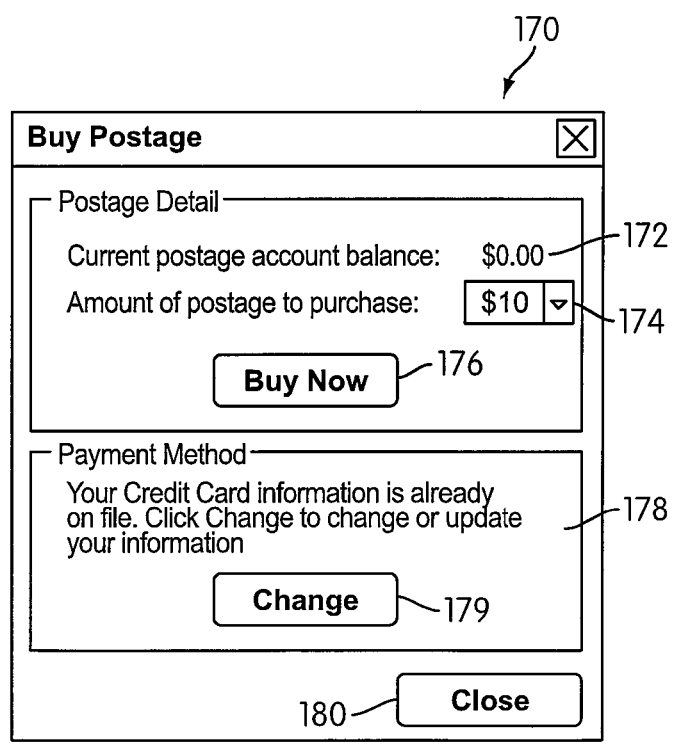
FIG. 6 depicts a "Buy Postage" window for selecting an amount of postage to purchase and initiating the purchase, according to an embodiment of the present invention.

The window 50 also includes a plurality of menu selections including file menu 54 where the users can, for example, print or test print a stamp label selection or switch to a postage roll window, account menu 55 where the user can input, manage account information, buy postage, view usage reports, and preferences, supplies menu 56 where the user can order supplies such as postage label sheets or order free postal service supplies such as flat rate boxes and envelopes, and a help menu 57 for providing help on how to use specific items or menus of the software application, ordering stamps with a specific picture. The window 50 also includes a plurality of buttons or icons such as buy postage icon 58, buy labels icon 59 and account 60. The user can select buy postage icon 58 to initiate buying postage, select buy labels icon 59 to initiate buying labels or select account icon 60 to input, check, or update account information. By clicking on "buy postage" a window 170, shown in FIG. 6, is displayed prompting the user to purchase stamps, as described further in detail in the following paragraphs. By clicking on the "buy labels" icon 59, an imbedded web link opens a webpage of the internet postage provider enabling the user to order postage labels such as postage label sheets 10 or postage label rolls or other items. By clicking on the icon "account" 60, an imbedded web link opens a webpage of the internet postage provider enabling the user review the user's account information such as the type of account (e.g., monthly, basic, premium, professional, etc.), the date of the account was established, the postage usage status, account transactions, etc.

The window 50 also includes a plurality of scroll-down menus such as a scroll down menu 62 for selecting the type of mail piece on which a postage label 53 printed with purchased postage indicia (e.g., postage stamp) is to be affixed, scroll down menu 64 for selecting the postage value and scroll down menu 66 for selecting the number of printable postage sheet to purchase. Mail piece type menu 62 can include mail piece selections such as letter envelope, large envelope, postcard, flat rate envelope, package or parcel, flat rate box, large flat rate box, tube, etc. With each selection a graphical representation of the type of mail piece may also be displayed next to the type of mail piece. For example, as shown in FIG. 5, an image representing a letter envelope is displayed next to the selection letter envelope. Postage value menu 64 can include most common selections such as first class mail, express mail, priority mail, or international mail, or a space to allow a user to enter a specific value such as, for example, a postage stamp of $0.42, a postage stamp of $1.00, or a postage stamp of $0.01, etc. The postage value menu 64 can be customized depending upon the selection made in the type of mail piece menu 62. For example, if "letter envelope" is selected in the type of mail piece menu 62, the postage value menu 64 can provide, for example, the following selections: first-class, 1-oz. ($0.42), 2-oz. ($0.59), "make your own", etc. If "package" is selected in the type of mail piece menu 62, the postage value menu 64 can provide, for example, the following selections: 1-oz. ($1.17), 2-oz. ($1.34), 10-oz. ($2.70), priority mail 1 lb. ($4.80), "make your own", etc. If "flat rate envelope" is selected in the type of mail piece menu 62, the postage value menu 64 can provide, for example, the following selections: priority mail ($4.80), express mail ($16.50), "make your own", etc. Adjacent to the mail piece type menu 62, a "guide me" button 61 is provided. The user can learn more about the various menus and features by clicking the "guide me" button 61. By clicking on the "guide me" button 61 a window opens up allowing the user to learn more about the various menus, features. The window 50 also includes a review postage total and print sub-window 68. The sub-window 68 includes the current balance the customer's account 68A, the total print cost 68B and optionally the ending balance 68C. The total print cost 68B is the cost to purchase the postage indicia selected.

The window 50 also includes a print icon 70 and a test print icon 72. When the user clicks on the print icon 70, a window opens prompting the user to print all the postage stamps in the sheet, print selected postage stamps in the sheet, or cancel. When the user clicks on the test print icon 72, a similar window opens prompting the user to print all the postage stamps, print selected postage stamps, or cancel.

Returning now to FIG. 4, subsequent to selecting the type of mail piece, the postage value, the number of postage stamps, etc. in window 50, at S30, and upon clicking on print button 70 in window 50, the personal computer 902 (shown in FIG. 9) of the user communicates various parameters with the computer server 900 (shown in FIG. 9) of the internet postage provider. These parameters include the account number of the user (i.e., the personal account number assigned to the user when the user opens an account with the internet postage provider), the number of postage stamps to print, the part number of supply stock which are a plurality of different sheet layouts that the user can select from, such as the postage label sheet layout 10 depicted in FIG. 1, and a unique identification number associated with the software application installation on the personal computer 902 of the user.

The computer server 900 checks the account of the user to verify availability of funds in the user's account. If the user's account does not have sufficient funds, the software application opens a window with the following message "Your postage account has a zero balance. You need $10.08 to print postage. Would you like to buy postage now," for example, followed by two buttons "Yes" or "No." The amount specified may vary depending on the number of postage indicia to print. If the user clicks on the button "Yes", the software application opens a window "Buy Postage" 170, shown in FIG. 6. The "Buy Postage" window 170 includes the current postage account balance 172 in the user's account, the amount of postage to purchase 174. The user can select any desired amount from a scroll down menu (e.g., $10.00). The "Buy Postage" window also includes a "Buy Now" button 176. If the user clicks on the "Buy Now" button 176, the amount specified in the amount of postage to purchase 174 is charged on a user's credit card. The user's credit card number is provided by the user when signing up for an account with the internet postage provider. As a result of charging the user's credit card, the user's account balance is credited by the amount charged to the credit card (e.g., $10.00). The window 170 also includes a "payment method" sub-window provided with a "change" button 179. The user can modify the credit card information by clicking on the change button 179. A link is imbedded in the button 179 that opens the user's account webpage to allow the user to enter or change the payment information.

The computer server 900 then determines if an activation code, security code or serial code associated with the sheet of postage label 10 is required or not, at S50. The activation code is used to verify that the user is using authentic postage label sheets as opposed to copied or counterfeited postage label sheets. The computer server 900 uses a number of criteria to determine if the activation code is required. One criterion is the type of account the user is holding (a monthly fee based account, a professional account, a free account, etc.). For example, if the user is a holder of a monthly fee based account, where the user pays the internet postage provider a standardized monthly fee, the requirement for inputting an activation code may be waived. Another criterion can be a threshold set relating to how long the user's account been active. For example, if the user had the account for a long period of time (e.g., more than 1 year), the activation code may only be required for printing a certain value or type of postage stamps. Another criterion can be the type of postage being purchased or the amount being spent to purchase indicia. For example, if the user is purchasing indicia to print only one first class stamp with a value of $0.42, the user may not be required to enter the activation code, but if the user is purchasing indicia to print $5.00 or more worth of stamps (for example) in any one printing operation, the activation code can be required. Or, the threshold value for requiring an activation code may be set based upon the value of purchases made over a certain period of time (e.g., more than $10 in one day, for example). Another criterion may be the total amount spent by the user since inception of the user's account. For example, if the user's purchasing history shows that the user spent a large sum (e.g. $500 or more) for the purchase of indicia, the requirement to enter the activation can be waived, as we are dealing with a well-established, paying customer. Yet, another criterion may be tied to the purchase history of labels by the user. For example, if the user has previously purchased labels from the internet postage provider, it is less likely that the user would use counterfeit postage labels. Hence, in this case, the activation code may not be required or required only if the user is purchasing a large amount of postage stamps (e.g., greater than $100). The computer server 900 may require the activation code for each printed postage label sheet or may only require the activation code after printing a certain number of postage label sheets, for example after printing 10 postage label sheets. The determination of the frequency of requiring the activation code (e.g., every single one printed postage label sheet, every two printed postage label sheets, every 10 printed postage label sheets, or no activation code is required, etc.) depends on one or more of the above criteria.

If the activation code is required, the user is prompted to enter or input the activation code or serial number, at S60. The computer server 900 verifies if the activation code or serial number is authentic, at S70. The computer server 900 authenticates the activation code by comparing the input activation code with a database of activation codes stored at the server computer 900 (for example stored in the storage device 901B). If the activation code entered by the user is not a valid activation code, the user is prompted to reenter a valid activation code. After a certain number of attempts, a message is displayed to the user stating "activation code invalid." If the activation code entered by the user is valid, a print dialog window opens, at S80 to allow the user to print the postage stamps on the postage labels using the printer 906 in communication with the personal computer 902 of the user. Once the printing is complete, at S90, the user's account is updated to increment the print count in the user's account by the number of postage stamps printed, at S100. The cost of the printed postage stamps is deducted from the user's account balance.

Although the various steps of the method of providing or printing postage indicia are described in the above paragraphs as occurring in a certain order, the present application is not bound by the order in which the various steps occur. In fact, in alternative embodiments, the various steps can be executed in an order different from the order described above.

Figure 7:
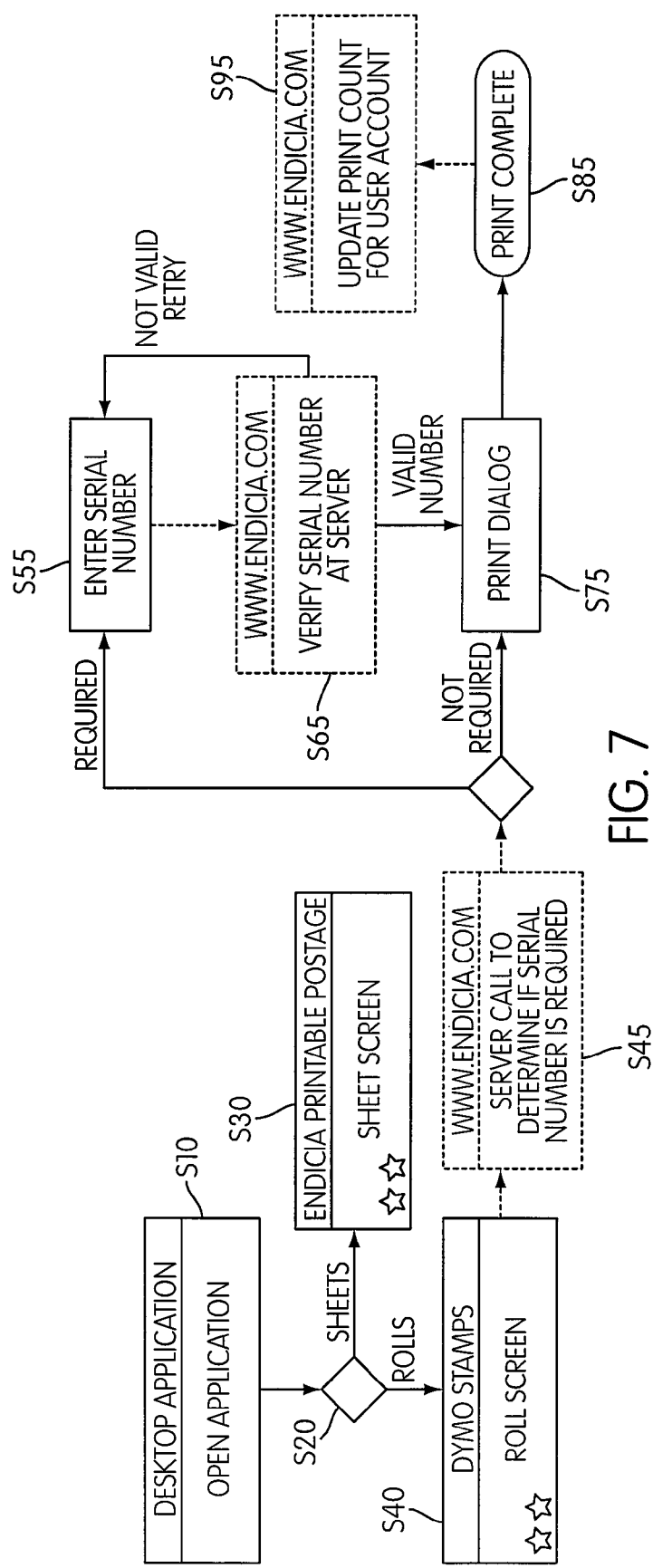
FIG. 7 is a flow diagram of a method of purchasing postage indicia, according to another embodiment of the present invention.

FIG. 7 is a flow diagram of a method of purchasing postage indicia, according to another embodiment of the present invention. This flow diagram is similar to the flow diagram depicted in FIG. 4. However, this flow diagram pertains more specifically to the option of printing rolls of postage labels, at S40. The roll of postage labels can be purchased directly from the internet postage provider or obtained from other outlets. Contrary to the sheets of labels, the roll of postage labels are printed on a roll printer such as a DYMO label printer manufactured by Dymo, a division of Sanford L.P. in North America (U.S.A.) and by Dymo BVBA in Begium. In the case the user selects to print on a roll of postage labels, at S40, a window 80 is displayed on a screen of the user's personal computer 902.

Figure 8:
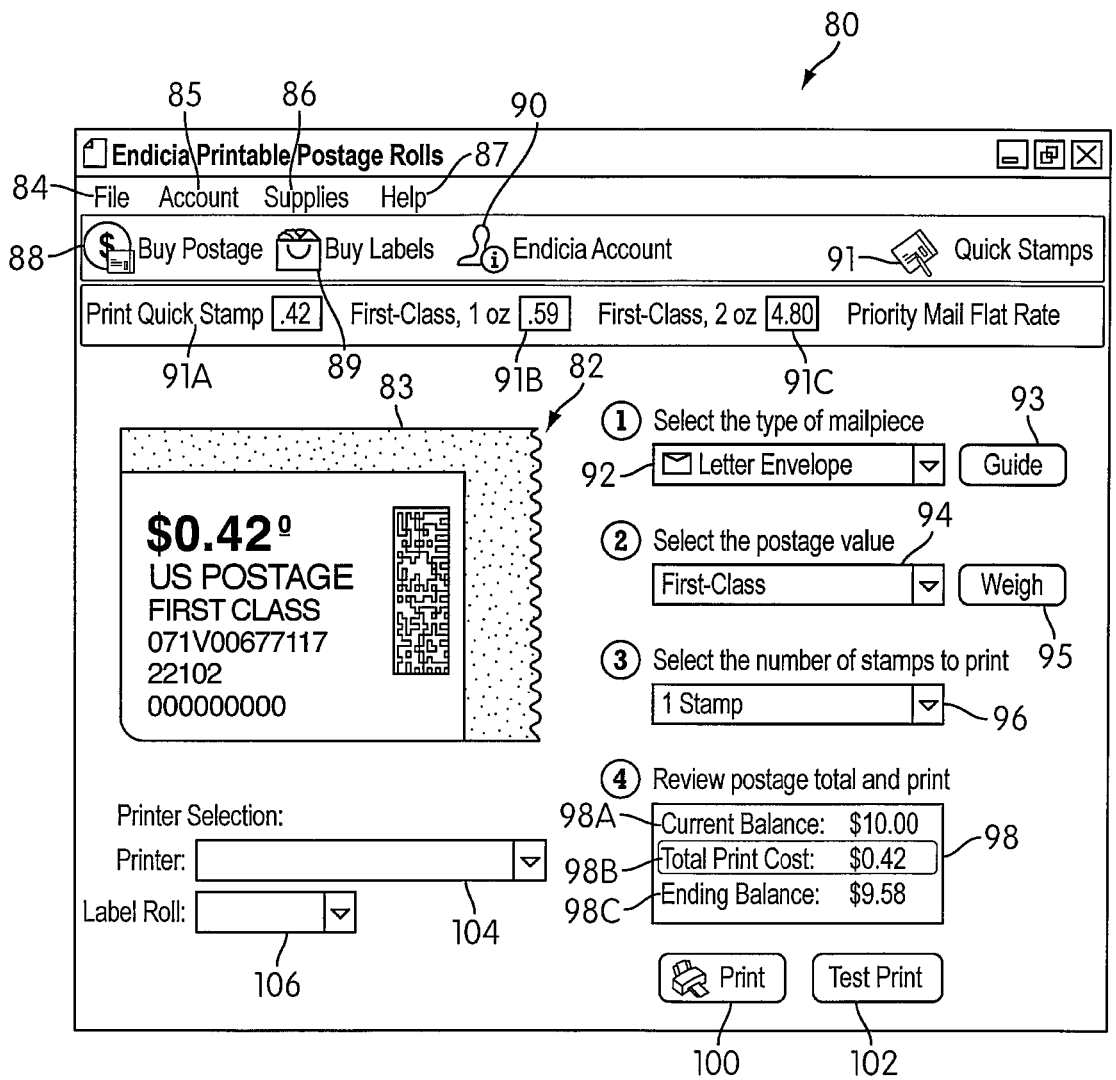
FIG. 8 depicts a window for selecting various parameters of the postage indicia, according to another embodiment of the present invention.

FIG. 8 depicts the window 80, according to an embodiment of the present invention. Window 80 includes an area 82 where an image of a postage stamp 83 is displayed. Similar to window 50 depicted in FIG. 4, the window 80 also includes a plurality of menu selections including file menu 84 where the users can, for example, print or test print a postage label selection or switch to a postage roll window, account menu 85 where the user can input, manage account information, buy postage, view usage reports, and preferences, supplies menu 86 where the user can order supplies such as postage label sheets or order free postal service supplies such as flat rate boxes and envelopes, and a help menu 87 for providing help on how to use specific items or menus of the software application, ordering stamps with a specific picture. The window 80 also includes a plurality of buttons or icons such as buy postage icon 88, buy labels icon 89 and account 90. The user can select buy postage icon 88 to initiate buying postage, select buy labels icon 89 to initiate buying labels or select account icon 90 to input, check, or update account information. By clicking on "buy postage" a window 170, shown in FIG. 6, is displayed prompting the user to purchase stamps, as described in the above paragraphs. By clicking on the "buy labels" icon 89, an imbedded web link opens a webpage of the internet postage provider enabling the user to order postage labels such as postage label rolls or other items. By clicking on the icon "account" 90, an imbedded web link opens a webpage of the internet postage provider enabling the user to review the user's account information such as the type of account (e.g., monthly, basic, premium, professional, etc.), the date of the account was established, the postage usage status, account transactions, etc. The window 80 also includes icon "Quick Stamps" 91. By clicking on icon quick stamps 91, a plurality of icons "print quick stamp 0.42 First-Class, 1 oz." 91A "print quick stamp 0.59, 2 oz." 91B, and "print quick stamp 4.80 Priority Mail Flat Rate" 91C can be displayed. These icons are a short cut and can provide a quick access to most used stamps. Although few postage type selection icons are displayed as short cut icons, any number of selections can be displayed as desired.

The window 80 also includes a plurality of scroll-down menus such as a scroll down menu 92 for selecting the type of mail piece on which a purchased postage stamp 83 is to be affixed, scroll down menu 94 for selecting the postage value and scroll down menu 96 for selecting the number of postage indicia to print (e.g., 1 stamps, 2 stamps, 3 stamps, etc.). Similar to the window 50, mail piece type menu 92 can include mail piece selections such as letter envelope, large envelope, postcard, flat rate envelope, package or parcel, flat rate box, large flat rate box, tube, etc. With each selection a graphical representation of the type of mail piece may also be displayed next to the type of mail piece. For example, as shown in FIG. 8, an image representing a letter envelope is displayed next to the selection letter envelope. Postage value menu 94 can include most commons selections such as first class mail, express mail, priority mail, or international mail, or a space to allow a user to enter a specific value such as, for example, a postage stamp of $0.42, a postage stamp of $1.00, or a postage stamp of $0.01, etc. The postage value menu 94 can be customized depending upon the selection made in the type of mail piece menu 92. For example, if "letter envelope" is selected in the type of mail piece menu 92, the postage value menu 94 can provide, for example, the following selections: first-class, 1-oz. ($0.42), 2-oz. ($0.59), "make your own", etc. If "package" is selected in the type of mail piece menu 92, the postage value menu 94 can provide, for example, the following selections: 1-oz. ($1.17), 2-oz. ($1.34), 10-oz. ($2.70), priority mail 1 lb. ($4.80), "make your own", etc. If "flat rate envelope" is selected in the type of mail piece menu 92, the postage value menu 94 can provide, for example, the following selections: priority mail ($4.80), express mail ($16.50), "make your own", etc. Adjacent to the mail piece type menu 92, a "guide me" button 93 is provided. The user can learn more about the various menus and features by clicking the "guide me" button 93. By clicking on the "guide me" button 94 a window opens up allowing the user to learn more about the various menus, features. The window 80 also includes a review postage total and print sub-window 98. The sub-window 98 includes the current balance the customer's account 98A, the total print cost 68B and optionally the ending balance 98C. The total print cost 98B is the cost to purchase the number of postage indicia (e.g., postage stamps) selected in menu 96.

The window 80 also includes a weigh icon 95. By clicking on the weigh icon 95, the personal computer 902 can automatically read the weight of the mail (e.g., envelope, package, etc.) from a scale connected to the personal computer 902. In one embodiment, the user can then select the postage value in "select postage value" menu 94 based on the weight and the type of mail piece selected in mail piece type menu 92. Alternatively, in another embodiment, the postage value can be selected automatically by the personal computer 902 using the type of mail piece and the weight of the mail piece acquired from the scale connected to the personal computer 902.

The window 80 also includes a print icon 100 and a test print icon 102. When the user clicks on the print icon 100, the number of postage indicia (e.g., the number of postage stamps such as 10 stamps) selected in menu 96 are printed in the roll label printer. When the user clicks on the test print icon 102, postage indicia can be printed on a test label or a normal label (e.g., as stamps). In the test print mode, the user is not charged any amount for printing the postage indicia. Therefore, the user is able to test print on either a test label or a normal label without incurring any charge.

The window 80 further includes a printer selection menu 104 and label roll selection menu 106. The printer selection menu 104 allows the user to select the appropriate roll printer (e.g. DYMO printer) that is connected to the personal computer 902. The label roll menu 106 enables the user to select the type of label roll that is used to print the postage indicia.

Returning now to FIG. 7, subsequent to selecting the type of mail piece, the postage value, the number of postage stamps, etc. in window 80, at S40, and upon clicking on print button 100 in window 80, the personal computer 902 of the user communicates with the computer server 900 of the internet postage provider various parameters. These parameters include the account number of the user (personal account number when you open an account with the internet postage provider), the number of postage indicia to print, the part number of supply stock which are a plurality of different roll labels layouts that you can select from, and a unique identification number associated with the software application installation on the personal computer 902 of the user.

Similar to the embodiment depicted in FIG. 4, the computer server 900 checks the account of the user to verify availability of funds in the user's account. If the user's account does not have sufficient funds, the software application opens a window with the following message "Your postage account has a zero balance. You need $10.08 to print postage. Would you like to buy postage now," followed by two buttons "Yes" or "No." The amount specified may vary depending on the number of postage indicia to print. If the user clicks on the button "Yes", the software application opens a window "Buy Postage" 170, shown in FIG. 6 and described in the above paragraphs.

The computer server 900 then determines if an activation code, security code or serial code associated with the roll of labels is required or not, at S45. The activation code is used to verify that the user is using an authentic roll of labels as opposed to copied or counterfeited roll of labels. Similar to the embodiment depicted in FIG. 4, the computer server 900 uses a number of criteria to determine if the activation code is required. One criterion is the type of account the user is holding (a monthly fee based account, a professional account, a free account, etc.). For example, if the user is a holder of a monthly fee based account, where the user pays the internet postage provider a standardized monthly fee, the requirement for inputting an activation code may be waived. Another criterion can be a threshold set relating to how long the user's account been active. For example, if the user had the account for a long period of time (e.g., more than 1 year), the activation code may only be required for printing a certain value or type of postage stamps. Another criterion can be the type of postage being printed or the amount being spent to purchase stamps. For example, if the user is printing only one first class stamp with a value of $0.42, the user may not be required to enter the activation code, but is the user is purchasing indicia to print $5.00 or more worth of stamps (for example) in any one printing operation printing, the activation code can be required. Or, the threshold value for requiring an activation code may be set based upon the value of purchases made over a certain period of time (e.g., more than $10 in one day, for example). Another criterion may be the total amount spent by the user since inception of the user's account. For example, if the user's purchasing history shows that the user spent a large sum (e.g. $500 or more) for the purchase of indicia, the requirement to enter the activation can be waived, as we are dealing with a well-established, paying customer. Yet, another criterion may be tied to the purchase history of labels by the user. For example, if the user has previously purchased labels from the internet postage provider, it is less likely that the user would use counterfeit postage roll labels. Hence, in this case, the activation code may not be required or required only if the user is purchasing a large amount of postage indicia (e.g., greater than $100).

If the activation code is required, the user is prompted to enter or input the activation code or serial number, at S55. The computer server 900 verifies if the activation code or serial number is authentic, at S65. The computer server 900 authenticates the activation code by comparing the input activation code with a database of activation codes stored at the computer server 900. If the activation code entered by the user is not a valid activation code, the user is prompted to reenter a valid activation code. After a certain number of attempts, a message is displayed to the user stating "activation code invalid." If the activation code entered by the user is valid, a print dialog window opens, at S75 to allow the user to print the postage indicia on the postage labels using a roll label printer in communication with the personal computer 902 of the user. Once the printing is complete, at S85, the user's account is updated to increment the print count in the user's account by the number of postage indicia printed, at S95. The cost of the printed postage indicia is deducted from the user's account balance.

Although the various steps of the method of providing or printing postage indicia are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

It should be appreciated that in one embodiment, the drawings herein are drawn to scale (e.g., in correct proportion). However, it should also be appreciated that other proportions of parts may be employed in other embodiments.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method of providing postage indicia to a user, comprising:
   receiving an account number of the user at a computer server associated with a postage provider;
   receiving, at the computer server, a request to print one or more postage indicia on at least one of a plurality of postage labels from the user;
   determining, by the computer server, depending on a predetermined parameter, whether an input by the user of an activation code associated with the plurality of postage labels is required, wherein the requirement for the input of the activation code is waived if the predetermined parameter is satisfied; and
   sending, by the computer server, an authorization to print the one or more postage indicia on the at least one of the plurality of postage labels to the user if the input of the activation code is waived or if the input of the activation code is required and the activation code is valid.

2. The method of claim 1, further comprising:
   verifying availability of funds in the account of the user, wherein the sending of the authorization to print comprises sending the authorization to print when there are enough funds to purchase the one or more postage indicia.

3. The method of claim 1, wherein the predetermined parameter includes a type of account the user is holding, a type of postage indicia being purchased, an amount being spent to purchase postage indicia, or an amount spent since inception of the account, or a combination of two or more thereof.

4. The method of claim 3, wherein the type of account includes a fee based account or a free account.

5. The method of claim 4, wherein the requirement for the input of the activation code is waived if the type of account is a fee based account.

6. The method of claim 1, further comprising selectively prompting the user to input the activation code each time the computer server receives a request to print one or more postage indicia.

7. The method of claim 6, wherein the one or more postage indicia are located on a single sheet of postage labels.

8. The method of claim 1, further comprising selectively prompting the user to input the activation code at a frequency depending upon the predetermined parameter.

9. The method of claim 8, wherein the frequency of the prompting decreases if the user holds a monthly fee based account.

10. The method of claim 1, further comprising: prior to sending, by the computer server, the authorization to print one or more postage indicia, authenticating the activation code by comparing the activation code with a database of activation codes stored at the computer server.

11. The method of claim 1, further comprising: reducing an account balance of the user by a cost of the printed one or more postage indicia.

12. A method of processing a request for printing one or more postage indicia on one or more postage labels, comprising:
- receiving an account number of the user at a computer server associated with a postage provider;
- receiving, at the computer server, a request to print the one or more postage indicia on at least one of a plurality of postage labels from the user; and
- determining, by the computer server, depending on a predetermined parameter, whether an input by the user of an activation code associated with the plurality of postage labels is required, wherein the requirement for the input of the activation code is waived if the predetermined parameter is satisfied.

13. The method of claim 12, wherein the predetermined parameter includes a type of account the user is holding, a type of postage indicia being purchased, an amount being spent to purchase postage indicia, or an amount spent since inception of the account, or a combination of two or more thereof.

14. The method of claim 13, wherein the type of account includes a fee based account or a free account.

15. The method of claim 14, wherein the requirement for the input of the activation code is waived if the type of account is a fee based account.

16. A method of printing postage indicia, comprising:
- entering an account number associated with a user into a personal computer associated with the user, the personal computer being in communication with a computer server associated with a postage provider;
- requesting the computer server associated with the postage provider authorization to print one or more postage indicia on one or more postage labels;
- inputting an activation code associated with the one or more postage labels into the personal computer if the computer server requests the activation code, wherein the activation code is requested depending upon a plurality of parameters associated with the account number; and
- receiving from the computer server an authorization to print the one or more indicia on the one or more postage labels if either the request for the activation code by the computer server is waived or if the input of the activation code by the user is required and the activation code is valid.

17. A system application program, the program when executed by a personal computer in communication with a computer server causes the personal computer to receive instructions from the computer server, the instructions comprising:
- prompting a user to enter an account number associated with the user; and
- determining, by the computer server, depending on a predetermined parameter, whether an input by the user of an activation code associated with a plurality of postage labels is required, wherein the requirement for the input of the activation code is waived if the predetermined parameter is satisfied; and
- prompting the user to input the activation code if the activation code is required and not prompting the user to input the activation code if the requirement for the input of the activation code is waived.

18. The system application program of claim 17, wherein the predetermined parameter includes a type of account the user is holding, a type of postage indicia being purchased, an amount being spent to purchase postage indicia, or an amount spent since inception of the account, or a combination of two or more thereof.

19. The system application program of claim 18, wherein the type of account includes a fee based account or a free account.

20. The system application program of claim 17, wherein the prompting is waived if the type of account is a fee based account.

21. The system application program of claim 17, wherein the program when executed by the personal computer causes the personal computer to transmit the account number to the computer server.

22. The system application program of claim 17, wherein the program when executed by the personal computer enables the personal computer to print one or more postage indicia on the one or more postage labels.

* * * * *